US007240333B2

(12) United States Patent
Mainwaring et al.

(10) Patent No.: US 7,240,333 B2
(45) Date of Patent: Jul. 3, 2007

(54) DISPLAY OF A DIGITAL INFORMATION CONTENT AND METHOD OF SELECTION

(75) Inventors: Scott D. Mainwaring, Portland, OR (US); Timothy Brooke, Portland, OR (US)

(73) Assignee: Intel Corporation, Santa Clara, CA (US)

(*) Notice: Subject to any disclaimer, the term of this patent is extended or adjusted under 35 U.S.C. 154(b) by 521 days.

(21) Appl. No.: 09/962,939

(22) Filed: Sep. 21, 2001

(65) Prior Publication Data

US 2003/0061235 A1 Mar. 27, 2003

(51) Int. Cl.
G06F 9/44 (2006.01)
G06F 17/00 (2006.01)
G09G 5/00 (2006.01)

(52) U.S. Cl. .................... 717/127; 717/105; 345/581; 707/104.1

(58) Field of Classification Search ............ 717/125, 717/105; 345/764, 727, 760, 853, 735, 581; 707/100, 104.1; 434/307 R
See application file for complete search history.

(56) References Cited

U.S. PATENT DOCUMENTS

| 5,624,265 | A | * | 4/1997 | Redford et al. ......... 434/307 R |
| 5,740,440 | A | * | 4/1998 | West ......................... 717/125 |
| 5,831,610 | A | * | 11/1998 | Tonelli et al. ............. 345/735 |
| 5,969,719 | A | * | 10/1999 | Tsujimoto ................... 345/727 |
| 6,628,312 | B1 | * | 9/2003 | Rao et al. .................... 345/853 |
| 2002/0005866 | A1 | * | 1/2002 | Gorham et al. ............ 345/760 |
| 2002/0080195 | A1 | * | 6/2002 | Carlson et al. ............ 345/853 |
| 2002/0089540 | A1 | * | 7/2002 | Geier et al. ................ 345/764 |
| 2003/0009469 | A1 | * | 1/2003 | Platt et al. .................. 707/100 |

OTHER PUBLICATIONS

Kahn, "Metaphor Design," 1995.*
Jones et al., "Interface Design for Computer-based Learning Environments," 1995.*

* cited by examiner

Primary Examiner—Meng-Al T. An
Assistant Examiner—Insun Kang

(57) ABSTRACT

A method and apparatus conveying a generic digital information content to a user with a minimum amount of user interaction. The method includes associating a digital information content with a modeling system and displaying an association of the digital information content and the modeling system on a visual information display interface.

12 Claims, 8 Drawing Sheets

DISPLAY OF A DIGITAL INFORMATION CONTENT AND METHOD OF SELECTION

BACKGROUND OF THE INVENTION

1. Field of Invention

The present invention relates generally to information systems and more specifically to digital information content and methods of selecting an entry therefrom.

2. Art Background

Filing systems are in widespread use for both physical records and records that exist in the form of digital information content. Filing systems can occur without design or conscious thought simply by placing items together in a group. Groupings of this type commonly occur with record albums, audiotapes, compact disks, digital pictures, etc. FIG. 1 illustrates a stack of music compact disks (CDs) 100 that form a filing system. The CDs may be physically handled by a user, e.g., they may be picked up, read, examined, etc. However, entries within a digital file cannot be readily examined as the physical CDs can be.

A descriptive line of text typically represents each entry in a digital file. A user of the file system is faced with the task of reading individual lines of text that correspond with the particular entry in the file system. This is a tedious process that is often found to be unenjoyable. To simplify the task, search engines have been created to reduce the time needed to search large file systems. Alternatively, the group of lines of text representing the entries in the digital file may be indexed so that a logical order is established to help the user find an entry in a reduced amount of time.

Various attempts have been made to make entries in a digital file more accessible to the user. The icons on a computer system desktop that represent physical storage devices or locations within a storage device is one example. Another example is the thumbnail that represents a digital image or video file. These attempts are limited by the finite size of the window or information display that the thumbnail is displayed on. The number of entries in a digital file system is often large, with the total number of entries numbering into the thousands. It is not practical to display the contents of large file systems with the aforementioned techniques.

The user must rely on his or her memory to recall terms with which to query the search engine and/or scan through a list of text descriptors based on the results of the query. The combination of, listings of entries within a database, associated index, search engine, and selection mechanism is referred to in the art as a "user interface." FIG. 2 shows a present user interface for selecting and playing a digital music file, known in the art by one standard as an "MP3" file, according to the presently available user interface methods described previously. With reference to FIG. 2, a view within a window on an information display is shown at 200. An address to a location on a data storage device is shown at 202. For this example, 202 corresponds to a location given by "genres.mp3.com/music/pop_rock." Many entries are shown in 200. One entry at 204 is given by the text line "'Near The Son' by Throckmorton." This entry and others must be read by the user in order to make a selection. Controls for play at 206 must be selected as desired to play selection 204. Within the view provided by window 200 a limited number of entries are displayed according to the present format of display within the user interface. The user must scroll the view area of the window using scroll buttons at 208 and 210 to modify the field of view.

Another disadvantage to the presently available user interface, such as the one described in conjunction with FIG. 2, is that the interface is often times not intuitive enough for users of all ages and experience level with data processing systems to use. This problem limits the number of users who may be willing to use digital media storage devices.

A shortcoming that is common to all of the present filing systems/directories/indices previously described is that using these methods within a user interface does not present an entertaining experience to the user. The presently available user interfaces are tedious and time consuming to use. A parallel problem is that the contents of the filing system are not readily viewed by the user due to the attendant tedium experienced when access to the contents of the filing system is undertaken. A user who owns a collection of digital media content cannot readily show the content to another person due to the aforementioned limitations.

What is needed is a way of making the digital information content accessible to the user with a minimum of required user interaction.

BRIEF DESCRIPTION OF THE DRAWINGS

The present invention is illustrated by way of example and is not limited in the figures of the accompanying drawings, in which like references indicate similar elements.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those skilled in the art to practice the invention. The following detailed description is, therefore, not to be taken in a limiting sense, and the scope of the invention is defined only by the appended claims.

A method and apparatus are disclosed which convey a generic digital information content to a user with a minimum amount of user interaction by associating the digital information content with a modeling system. In one embodiment of the present invention, the digital information content corresponds to the contents of a filing system. The contents of the filing system are conveyed without the need for a text-based index of the contents of the filing system. In another embodiment of the present invention, the digital information content is a set of choices, which is associated with a modeling system and subsequently displayed on an information display. Associating the digital information content with the modeling system facilitates the display of a large number of entries within the digital information content. Visual accessibility to the entries of the information content enables the user to display or show the entries of the information content and to select from the entries displayed thereby.

Figure 8:
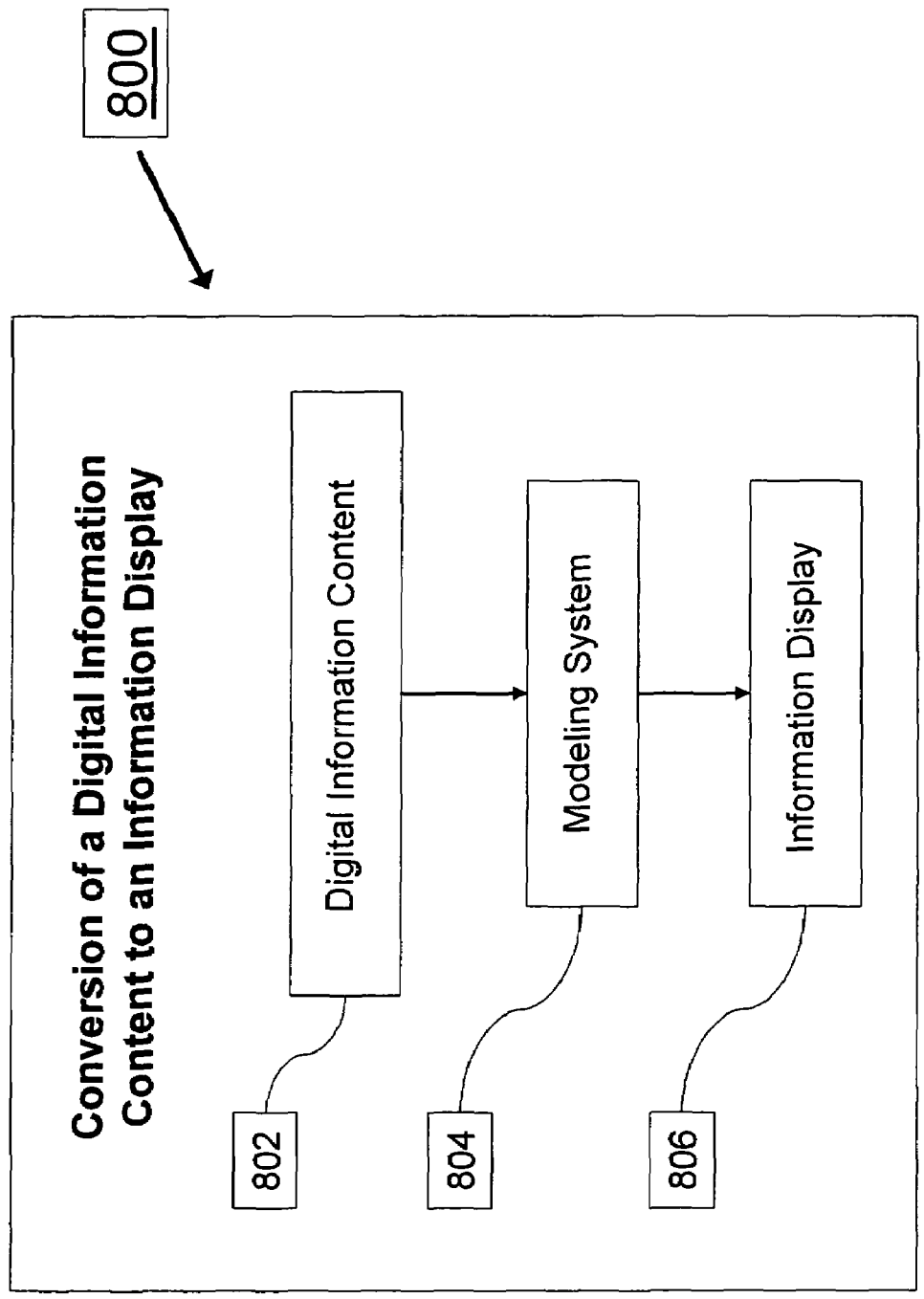
FIG. 8 illustrates a method of the present invention.

A method and apparatus are disclosed in FIG. 8 which convey a generic digital information content 802 to a user with a minimum amount of user interaction by associating the digital information content 802 an information display 806 though conversion using a modeling system 804. In one embodiment of the present invention, the digital information content 802 corresponds to the contents of a filing system. The contents of the filing system are conveyed without the need for a text-based index of the contents of the filing system. In another embodiment of the present invention, the digital information content 802 is a set of choices, which is associated with a modeling system 804 and subsequently displayed on an information display 806. Associating the digital information content 802 with the modeling system 804 facilitates the information display 806 of a large number of entries within the digital information content 802. Visual accessibility to the entries of the information content 802 enables the user to display or show the entries of the information content 802 and to select from the entries displayed thereby.

Figure 3:
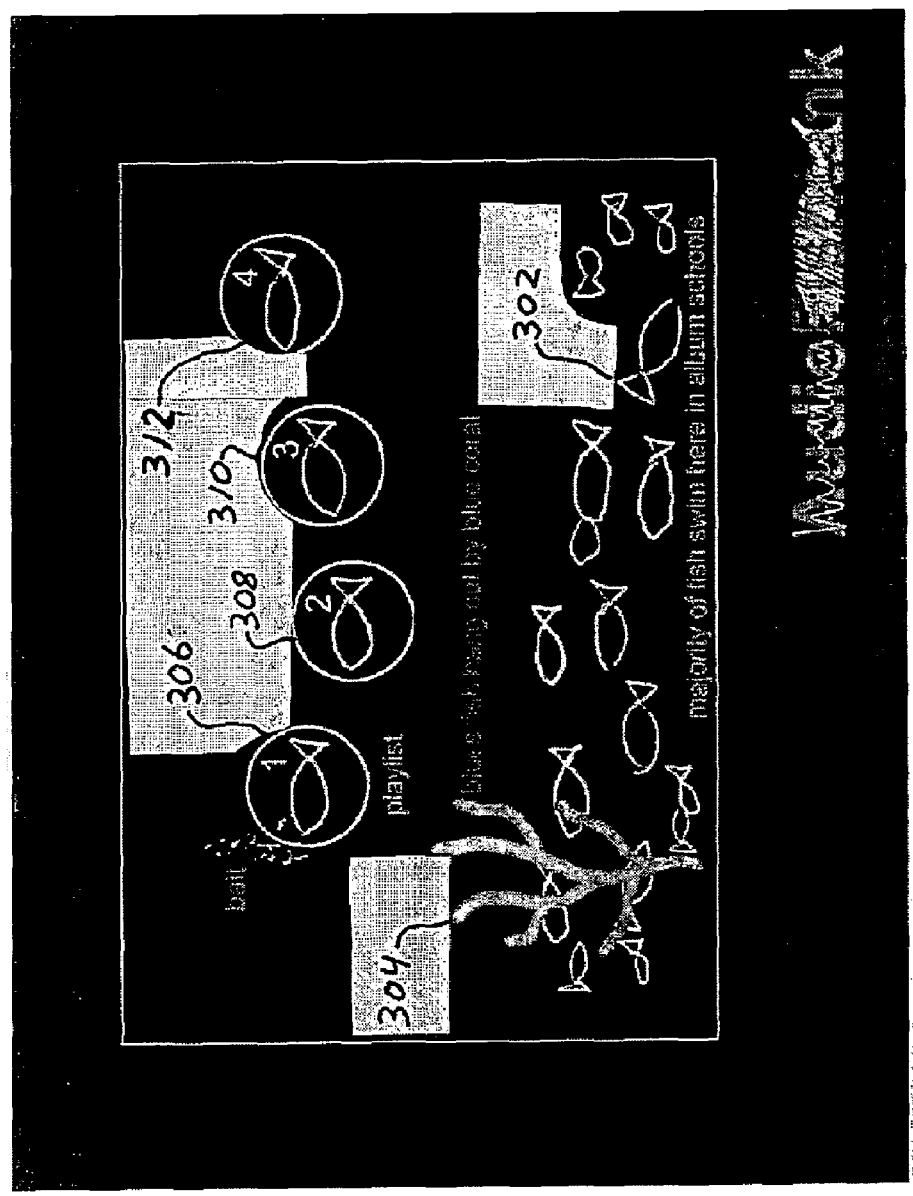
FIG. 3 illustrates the present invention using an aquatic ecosystem.

In one embodiment of the present invention, an ecosystem may be used as the modeling system 804 that is associated with a digital information content 802. The digital information content 802 may correspond to a digital media content, such as music files. The ecosystem may be an aquatic ecosystem where fish represent the digital media content. For example, the dynamic display of digital information content in this example is based on the metaphor of a fish tank. FIG. 3 illustrates the present invention using an aquatic ecosystem.

Figure 4:
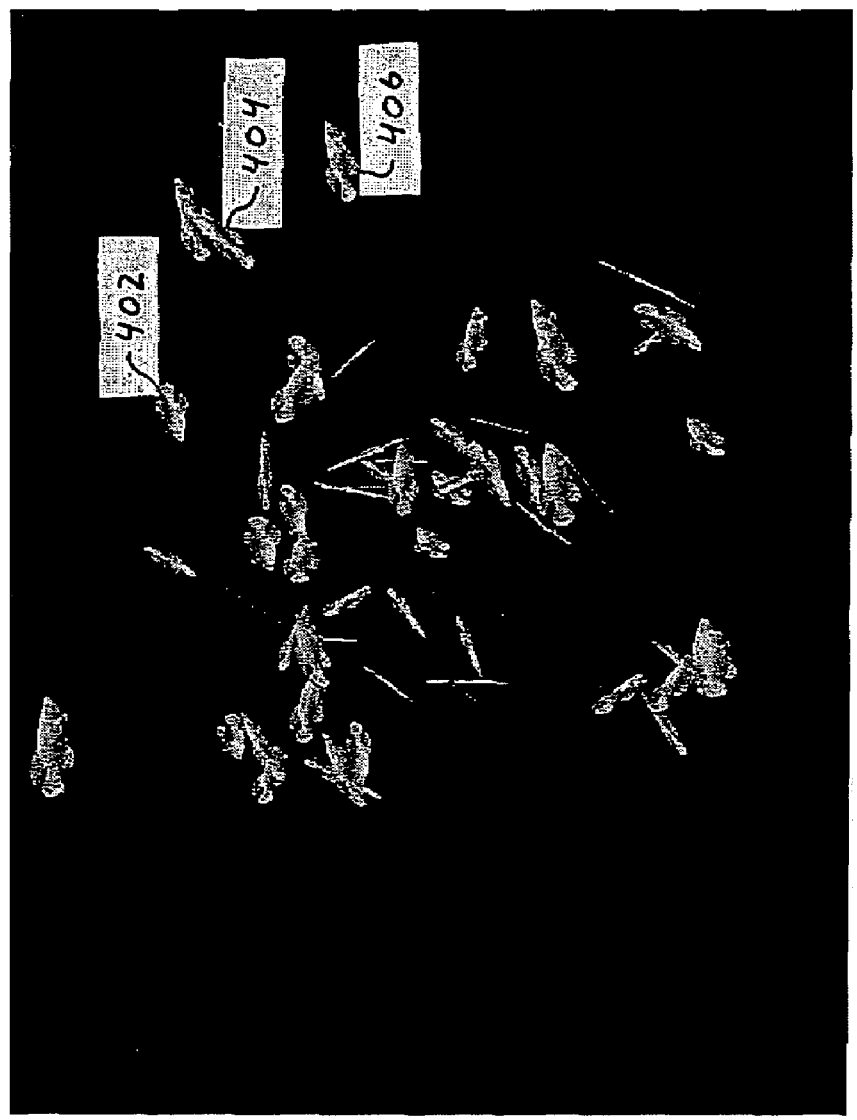
FIG. 4 illustrates "swimming" fish choreographed to a type of music.

Other structures may be added to the ecosystem 300 such as a rock, which could imply "rock and roll" music. Appropriate "rock and roll" album fish would be grouped and swim around the rock. As a "rock and roll" album was selected for play, the fish corresponding to a particular track would be animated to simulate movement in harmony with the rhythm of the music. FIG. 4 illustrates "swimming" fish 400 choreographed to an associated type of music. In one embodiment of the present invention, a fish 402 can be animated to emulate the rhythm of rock and roll, while another fish 404 can be animated to the movement appropriate for another type of music. Music that has no apparent rhythm may be emulated by animating the fish's movement to correspond with random motion.

Figure 1:
FIG. 1 illustrates a stack of music compact disks (CDs).
Figure 2:
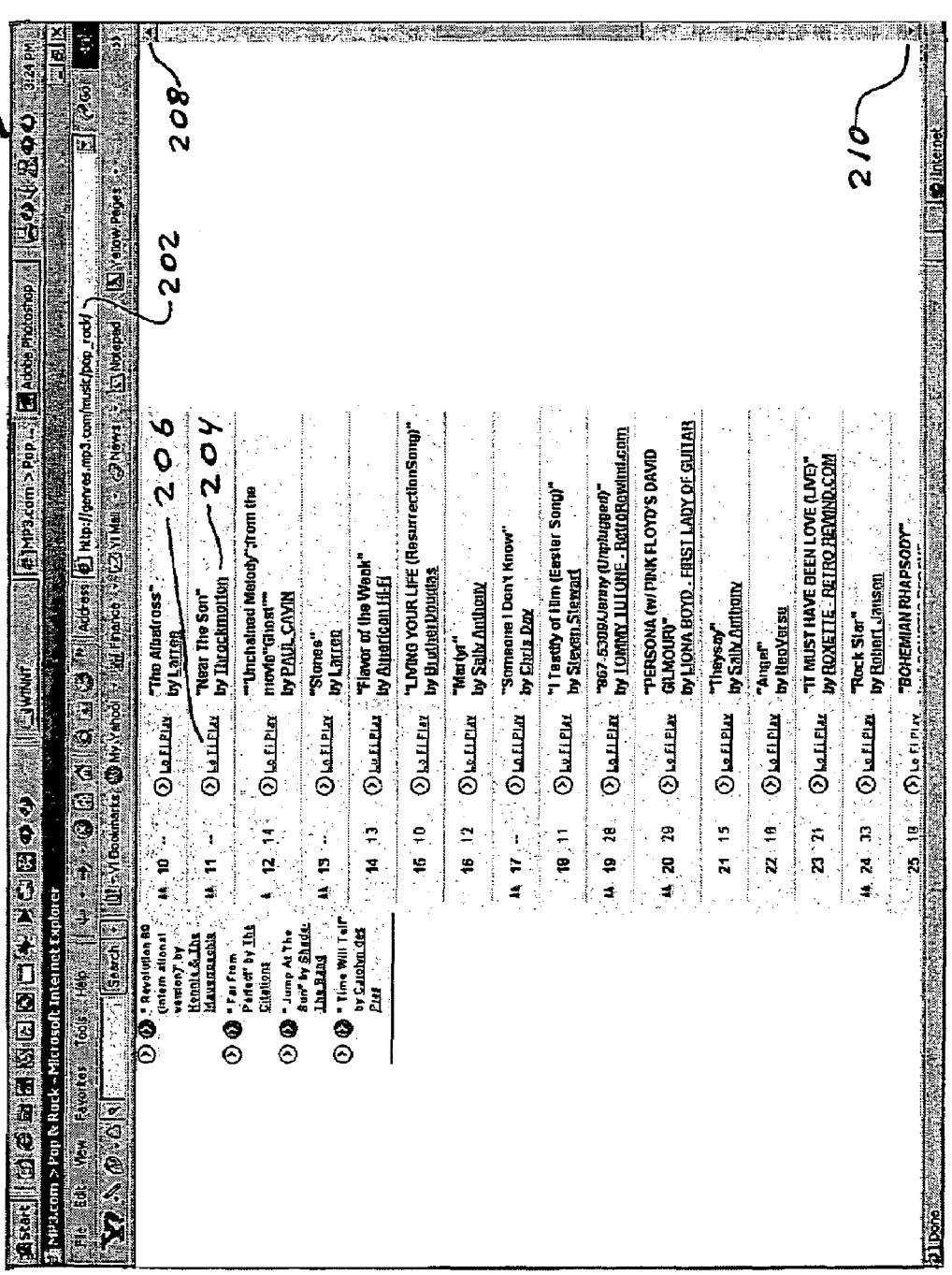
FIG. 2 shows a present user interface for selecting and playing an MP3 file.

Animation of the entries of the digital media content, swimming fish in the previous example, enables the user to view a large number of entries in a small amount of time, without the tedium of the present text based user interface as described in conjunction with FIG. 2. The ecosystem 300 may be displayed on any information display. A non-exclusive list of devices that may be used for the visualization of digital media content according to the teaching of the present invention includes a computer monitor, a television screen, a personal information management (PIM) device, and a cellular telephone screen. The present invention may also be implemented as a screen saver or may be integrated into an existing screen saver of an information display.

Figure 5:
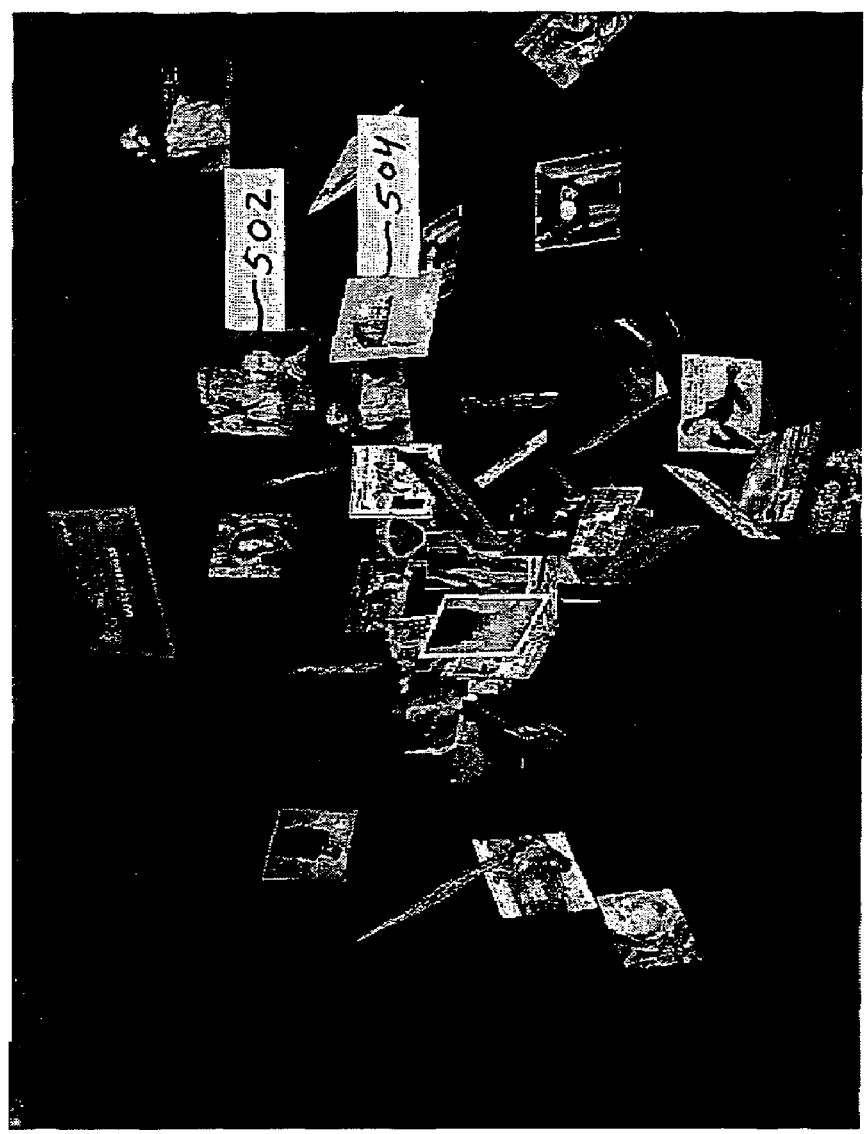
FIG. 5 depicts an array of animated music album covers.

Thus, the present invention, in one embodiment, imparts to fish the rhythm of music which is not a natural attribute of fish, similarly the attributes of fish are imparted to entries within the digital media content, in this example digital music, which are not natural attributes of digital music. The foregoing is an example of associating digital information content with a modeling system (the ecosystem of a fish tank). It will be noted that many embodiments of the present invention are possible within a given digital media content. For example, FIG. 5 depicts an array of animated music album covers according to the association under discussion. With reference to FIG. 5, groups or "schools" of album covers are animated to resemble fish in 500. The album covers shown in 500 can be displayed on any type of information display as previously described. An album 502 can be animated to behave like the fish 404 (FIG. 4) for example. An album 504 may rotate in space or revolve around the album 502.

Many other types of digital media content may be associated with the modeling system, for example, the album covers in 500 could represent digital pictures or video files. There is no limitation on the digital information content that can be associated with the modeling system. The present invention is not limited to associating digital media content with a modeling system. In another embodiment of the present invention, the association may be made between a set of choices or options available to the user and the modeling system. In one variation of this embodiment, a choice would be presented to the user in place of the album 502 or the album 504. For example 502 may correspond to a mutual fund and 504 may correspond to another mutual fund. The question might be which mutual fund does the user want to select. In this manner, a selection can be made without scrolling down multiple pages of text based names and having to make the selection from the text base. Families of mutual funds may correspond in an analogous fashion with the schools of fish previously described. Many other corresponding associations may be made according to the teaching of the present invention.

Many types of information displays are conducive to being used to display the association of the digital information content with the modeling system as previously mentioned. In one embodiment, a television may be used to tune to a channel where programming is selected for viewing according to the teaching of the present invention. The user interface for such an application may be a button on the television remote control. The user could use the selection button to place a piece of bait proximate to the fish tank as discussed in conjunction with FIG. 3. Different kinds of bait, jazz bait, rock and roll bait, etc., could be selected with the television remote control. An alternative user interface could be implemented, as is well known in the art, by voice command. With a voice activated interface the user would speak the command "Jazz", "Rock and roll" or "I want to catch a Jazz fish." The spoken command would launch the bait and initiate the process of playing the appropriate selection as discussed in conjunction with FIG. 3.

An ecosystem modeling system has been described within in the context of an aquatic environment using fish. Any ecosystem may be employed according to the teaching of the present invention. The type of ecosystem employed does not limit the present invention. Using the example of the digital media content, a zoo could be used as the modeling system where each type of animal corresponded to a genre of music. Alternatively, a barnyard could be used as the modeling system. A city could also be used as the modeling system where neighborhoods, stores, parks, etc. provided categorization to the digital information content associated thereby.

The complexity of the modeling system may span a range from highly complex to uncomplex. The ecosystems previously described are examples of more highly complex modeling systems. An example of an uncomplex modeling system is a simple random circulation of members of the digital information content. For example the album covers in FIG. 5 at 500 could simply move randomly. In the most general case the covers would pass through each other and at times move in and out of the view area provided within 500. Adding a rule to the system might be to constrain the motion between albums so that the albums did not pass through each other, but instead bounced off each other like particle motion according to Newtonian physics. Additional rules may be added to make the modeling system as complex as is desired or as loosely ordered as is desired. Alternative rules could require the album covers to move around each other, avoiding collisions thereby.

The complexity of the modeling system 804 may span a range from highly complex to uncomplex. The ecosystems previously described are examples of more highly complex modeling systems 804. An example of an un-complex modeling system 804 is a simple random circulation of members of the digital information content. For example the album covers in FIG. 5 at 500 could simply move randomly. In the most general case the covers would pass through each other and at times move in and out of the view area provided within 500. Adding a rule to the system might be to constrain the motion between albums so that the albums did not pass through each other, but instead bounced off each other like particle motion according to Newtonian physics. Additional rules may be added to make the modeling system 804 as complex as is desired or as loosely ordered as is desired. Alternative rules could require the album covers to move around each other, avoiding collisions thereby. Further, the modeling system may be chosen from a group comprising a chaos model, a random model, a fractal model, a particle model, an ecosystem model and a user defined model.

Figure 6:
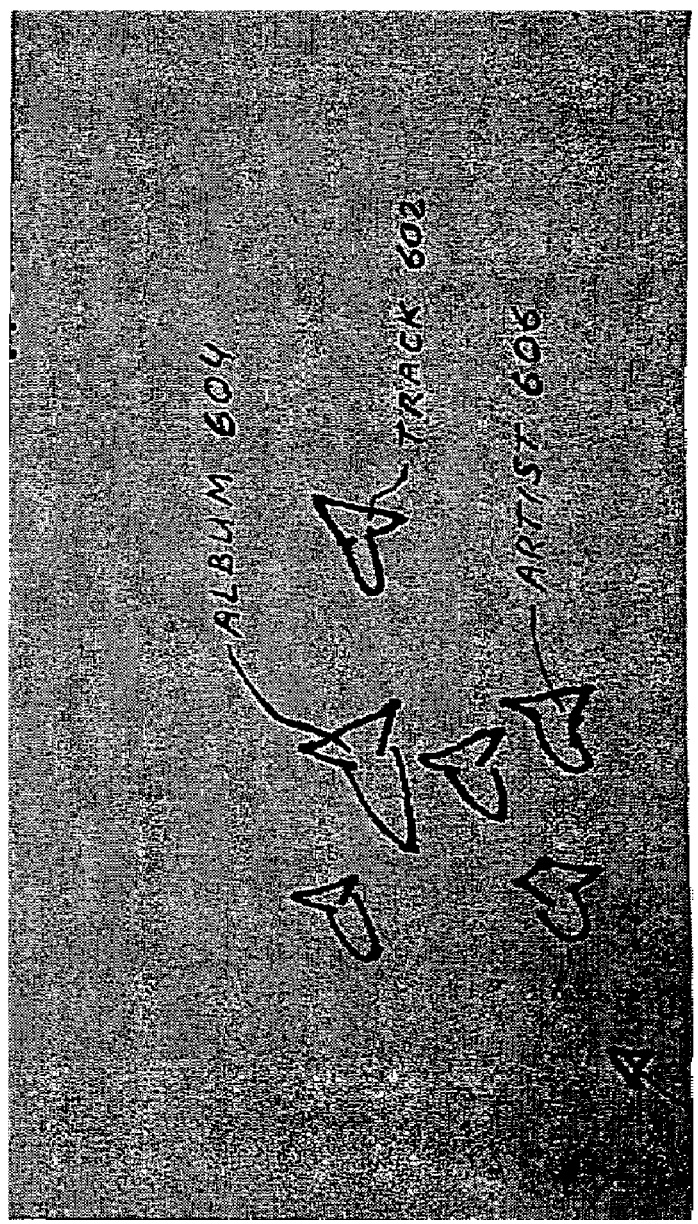
FIG. 6 illustrates scaling according to the teaching of the present invention.

The present invention is suited to scaling as the size of the digital information content increases or decreases. Within the example of the fish tank, and associated digital media representing songs, a fish may represent an individual song, an album, an artist or a genre of music. FIG. 6 illustrates scaling according to the teaching of the present invention at 600. With reference to FIG. 6, a music track is shown at 602. A fish corresponding to a plurality of tracks e.g., and album is shown at 604. The artist fish represents many albums and tracks at 606. A total size of the digital information content is flexible and may be scaled as additions are made or deletions occur within the teachings the present invention. The digital information content may be managed according to the teachings of the present invention.

Figure 7:
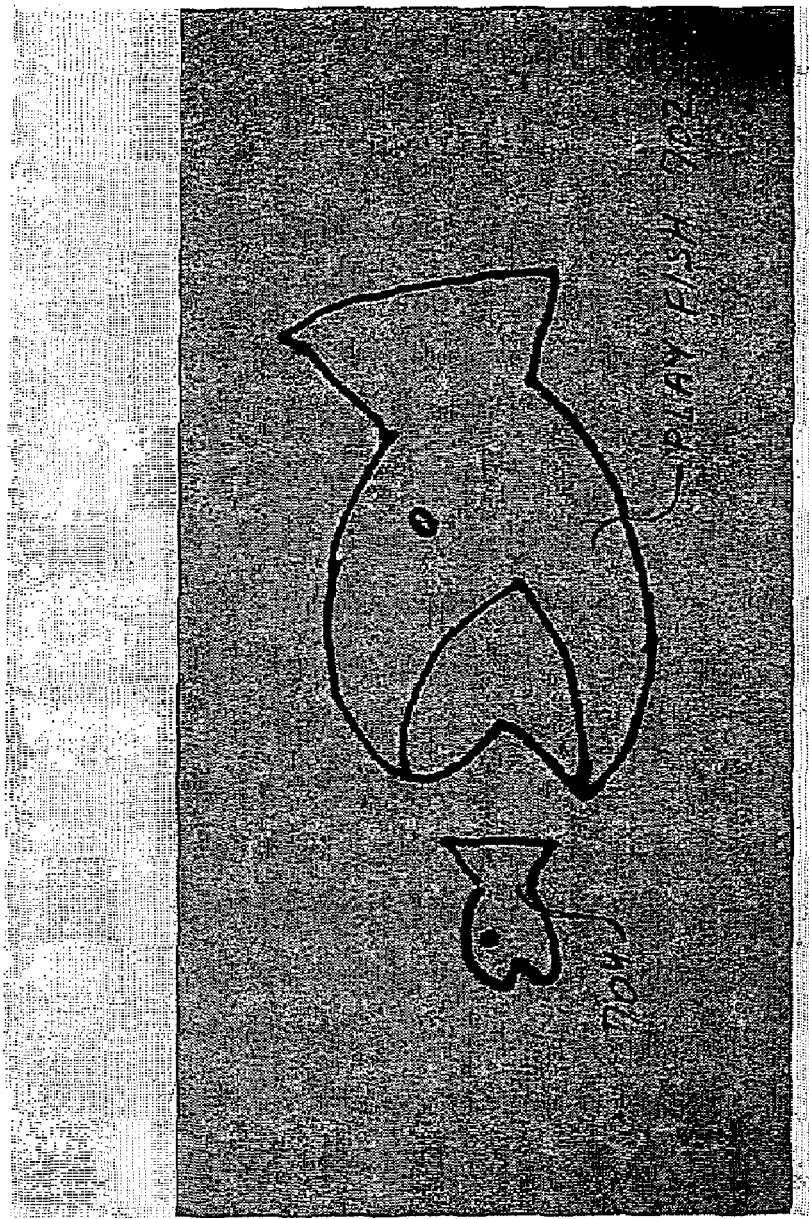
FIG. 7 illustrates a command metaphor.

An example of managing the digital information content is shown in FIG. 7 at 700. With reference to FIG. 7, use of a command metaphor for initiating a play instruction or removing an entry from the file by initiating a delete instruction is illustrated. A play fish 702 can be used to signal that a track represented by 704 is being loaded for play. The play fish 702 may swallow the fish 704, which represent the track to be played. An alternative use of a command metaphor might be to represent deleting a track or album with the act of a fish swallowing another. The present invention is flexible and may be configured with any rule, base to achieve the results desired and may be implemented with any of the computer programming techniques that are well known in the art.

It will be appreciated that the methods described in conjunction with the figures may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, and optical and magnetic disks. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Thus, a novel method and apparatus are disclosed which may be used to convey a generic digital information content to a user and allow the user to make a selection therefrom with a minimum amount of user interaction. Although the invention is described herein with reference to specific preferred embodiments, many modifications therein will readily occur to those of ordinary skill in the art. Accordingly, all such variations and modifications are included within the intended scope of the invention as defined by the following claims.

What is claimed is:

1. A method comprising:
   associating items from an ecological metaphor with components of digital information content; and
   displaying the items from the ecological metaphor on a display device;
   wherein the items from the ecological metaphor displayed on the display device comprise at least one item selected from the group consisting of: a seaweed, a rock, a coral, a type of fish, and a plant;
   wherein the components of digital information content comprise a first set of components in a first genre and a second set of components in a second genre; and
   wherein the operation of associating items from the ecological metaphor with the components of digital information content comprises:
      associating the first set of components with a first species from the ecological metaphor; and
      associating the second set of components with a second species from the ecological metaphor; and
   wherein the method further comprises:
      displaying individuals of the first species together as a first group in the display device; and
      displaying individuals of the second species together as a second group in the display device.

2. The method of claim 1, wherein said ecological metaphor is an aquatic environment model.

3. The method of claim 1, further comprising:
   displaying one or more fish as at least some of the items from the ecological metaphor; and
   moving at least one of the fish on the display device to simulate baiting of the fish when a user searches the components of digital information content.

4. The method of claim 1, further comprising:
   displaying one or more fish as at least some of the items from the ecological metaphor; and imparting a rhythmic motion to at least one of the displayed fish, the rhythmic motion corresponding to a rhythm for musical content stored in the digital information content associated with the at least one fish.

5. An apparatus, comprising:

a machine-accessible medium; and instructions in the machine-accessible medium, wherein the instructions, when executed by a data processing system, cause the data processing system to perform operations comprising:

associating items from an ecological metaphor with components of digital information content;

displaying the items from the ecological metaphor on a display device; and in response to user interaction with a displayed item from the ecological metaphor, performing an operation on the component of the digital information content associated with that displayed item;

wherein the items from the ecological metaphor displayed on the display device comprise at least one item selected from the group consisting of: a seaweed, a rock, a coral, a type of fish, and a plant;

wherein the components of digital information content comprise a first set of components in a first genre and a second set of components in a second genre;

wherein the operation of associating items from the ecological metaphor with the components of digital information content comprises:

associating the first set of components with a first species from the ecological metaphor; and associating the second set of components with a second species from the ecological metaphor; and wherein the instructions, when executed, cause the data processing system to perform further operations comprising:

displaying individuals of the first species together as a first group in the display device; and displaying individuals of the second species together as a second group in the display device.

6. An apparatus according to claim 5, wherein said ecological metaphor is an aquatic environment model.

7. An apparatus according to claim 5, wherein the instructions, when executed, cause the data processing system to perform operations comprising:

displaying one or more fish as at least some of the items from the ecological metaphor; and moving at least one of the fish on the display device to simulate baiting of the fish when a user searches the components of digital information content.

8. An apparatus according to claim 5, wherein the instructions, when executed, cause the data processing system to perform operations comprising:

displaying one or more fish as at least some of the items from the ecological metaphor; and imparting a rhythmic motion to at least one of the displayed fish, the rhythmic motion corresponding to a rhythm for musical content stored in the digital information content associated with the at least one fish.

9. A data processing system, comprising:

a processor;

a machine-accessible medium in communication with the processor; and instructions in the machine-accessible medium, wherein the instructions, when executed by the processor, cause the data processing system to perform operations comprising:

associating items from an ecological metaphor with components of digital information content;

displaying the items from the ecological metaphor on a display device; and in response to user interaction with a displayed item from the ecological metaphor, performing an operation on the component of the digital information content associated with that displayed item;

wherein the items from the ecological metaphor displayed on the display device comprise at least one item selected from the group consisting of: a seaweed, a rock, a coral, a type of fish, and a plant;

wherein the components of digital information content comprise a first set of components in a first genre and a second set of components in a second genre;

wherein the operation of associating items from the ecological metaphor with the components of digital information content comprises:

associating the first set of components with a first species from the ecological metaphor; and associating the second set of components with a second species from the ecological metaphor; and wherein the instructions, when executed, cause the data processing system to perform further operations comprising:

displaying individuals of the first species together as a first group in the display device; and displaying individuals of the second species together as a second group in the display device.

10. A data processing system, according to claim 9, wherein said ecological metaphor is an aquatic environment model.

11. A data processing system according to claim 9, wherein the instructions, when executed, cause the data processing system to perform operations comprising:

displaying one or more fish as at least some of the items from the ecological metaphor; and moving at least one of the fish on the display device to simulate baiting of the fish when a user searches the components of digital information content.

12. A data processing system according to claim 9, wherein the instructions, when executed, cause the data processing system to perform operations comprising:

displaying one or more fish as at least some of the items from the ecological metaphor; and imparting a rhythmic motion to at least one of the displayed fish, the rhythmic motion corresponding to a rhythm for musical content stored in the digital information content associated with the at least one fish.

* * * * *